United States Patent
Monroy-Hernández et al.

(10) Patent No.: US 12,475,655 B2
(45) Date of Patent: Nov. 18, 2025

(54) CONTEXT-BASED SELECTION OF AUGMENTED REALITY EXPERIENCES

(71) Applicant: Snap Inc., Santa Monica, CA (US)

(72) Inventors: Andrés Monroy-Hernández, Princeton, NJ (US); Ava Marie Robinson, New York, NY (US); Yu Jiang Tham, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/661,231

(22) Filed: Apr. 28, 2022

(65) Prior Publication Data

US 2023/0351701 A1 Nov. 2, 2023

(51) Int. Cl.
| | |
|---|---|
| *G06T 19/00* | (2011.01) |
| *G06F 3/0481* | (2022.01) |
| *G06Q 50/00* | (2012.01) |
| *G06T 11/60* | (2006.01) |
| *G06V 20/20* | (2022.01) |
| *H04L 67/131* | (2022.01) |
| *H04L 67/52* | (2022.01) |

(52) U.S. Cl.
CPC .......... *G06T 19/006* (2013.01); *G06F 3/0481* (2013.01); *G06Q 50/01* (2013.01); *G06T 11/60* (2013.01); *G06V 20/20* (2022.01); *H04L 67/131* (2022.05); *H04L 67/52* (2022.05)

(58) Field of Classification Search
CPC ....... G06T 19/006; G06T 11/60; G06T 19/20; G06T 7/70; G06T 2219/024; G06F 3/0481; G06F 3/04815; G06F 3/04842; G06Q 50/01; G06V 20/20; G06V 20/00; H04L 51/10; H04L 67/131

See application file for complete search history.

(56) References Cited

U.S. PATENT DOCUMENTS

| | | | |
|---|---|---|---|
| 11,397,462 B2 * | 7/2022 | Eledath | ................... G06F 3/011 |
| 11,604,581 B1 * | 3/2023 | Edwards | ............. G06F 3/04886 |
| 11,880,947 B2 * | 1/2024 | Assouline | ............. G06T 19/006 |

(Continued)

FOREIGN PATENT DOCUMENTS

| | | | | |
|---|---|---|---|---|
| CN | 115812217 A * | 3/2023 | ......... | G06Q 30/0282 |
| EP | 2426623 A2 * | 3/2012 | ............. | G06K 9/228 |

(Continued)

OTHER PUBLICATIONS

"International Application Serial No. PCT/US2023/066286, International Search Report mailed Jul. 24, 2023", 4 pgs.

(Continued)

*Primary Examiner* — Chante E Harrison
(74) *Attorney, Agent, or Firm* — Schwegman Lundberg & Woessner, P.A.

(57) ABSTRACT

The users' experience of engaging with augmented reality (AR) technology that permits users to interact with their environment and with each other is enhanced by automatically selecting an AR experience that is suitable for use given the physical environment of the user. The physical environment of the user is the physical environment of the user's computing device. The physical environment may include objects and/or conditions present in close proximity to the user's computing device, such as other humans, animals, and smart devices.

20 Claims, 12 Drawing Sheets

(56) References Cited

U.S. PATENT DOCUMENTS

| | | | |
|---|---|---|---|
| 2009/0157495 A1* | 6/2009 | Cahuzac | G06Q 30/02 |
| | | | 705/14.23 |
| 2016/0171767 A1* | 6/2016 | Anderson | G06F 3/011 |
| | | | 345/633 |
| 2018/0114364 A1* | 4/2018 | McPhee | G06T 15/20 |
| 2019/0019011 A1* | 1/2019 | Ross | G06T 19/006 |
| 2019/0347846 A1* | 11/2019 | Olson | G06F 16/58 |
| 2020/0066046 A1 | 2/2020 | Stahl et al. | |
| 2020/0322303 A1* | 10/2020 | Ri'Chard | H04L 51/222 |
| 2021/0133850 A1* | 5/2021 | Ayush | G06V 10/945 |
| 2021/0312678 A1* | 10/2021 | Luo | H04L 51/216 |
| 2022/0075591 A1* | 3/2022 | Cardenas Gasca | A63F 13/213 |
| 2022/0076492 A1 | 3/2022 | Smith et al. | |
| 2022/0101000 A1* | 3/2022 | Tham | G06V 20/20 |
| 2022/0206572 A1* | 6/2022 | Goodrich | G06V 40/19 |
| 2022/0207840 A1* | 6/2022 | Cansizoglu | G06V 20/20 |
| 2022/0276823 A1* | 9/2022 | Cardenas Gasca | A63F 13/48 |
| 2022/0292173 A1* | 9/2022 | Henry | G06F 21/45 |
| 2022/0300731 A1* | 9/2022 | Eirinberg | G06Q 50/01 |
| 2022/0301245 A1* | 9/2022 | Shuvi | G06V 20/00 |
| 2022/0319060 A1* | 10/2022 | Marinenko | G06Q 30/0276 |
| 2022/0319127 A1* | 10/2022 | Tkachenko | G06V 10/82 |
| 2022/0319229 A1* | 10/2022 | Babanin | G06T 11/60 |
| 2022/0319230 A1* | 10/2022 | Golobokov | G06V 40/174 |
| 2022/0319231 A1* | 10/2022 | Pankov | G06V 10/82 |
| 2022/0321804 A1* | 10/2022 | Demidov | G06V 40/166 |
| 2022/0374969 A1* | 11/2022 | Berger | G06Q 30/0643 |
| 2023/0098451 A1* | 3/2023 | Brown | G06F 3/04817 |
| | | | 701/93 |
| 2023/0106627 A1* | 4/2023 | Dascola | G06F 3/012 |
| | | | 345/419 |
| 2023/0115531 A1* | 4/2023 | Zohar | G06T 7/251 |
| | | | 345/418 |
| 2023/0127303 A1* | 4/2023 | Shahrokni | G06T 7/73 |
| | | | 345/419 |
| 2023/0176805 A1* | 6/2023 | Dudovitch | G06F 3/04842 |
| | | | 715/757 |
| 2023/0196602 A1* | 6/2023 | Assouline | G06V 10/56 |
| | | | 382/107 |
| 2023/0196685 A1* | 6/2023 | Assouline | G06T 13/40 |
| | | | 345/633 |
| 2023/0230292 A1* | 7/2023 | Ivanov | G06V 20/20 |
| | | | 345/633 |
| 2023/0342100 A1* | 10/2023 | Wawruch | G06F 3/1454 |
| 2023/0410440 A1* | 12/2023 | Boroujerdi | G06T 19/006 |

FOREIGN PATENT DOCUMENTS

| | | | | |
|---|---|---|---|---|
| WO | WO-2014119097 A1 * | 8/2014 | | A63F 13/213 |
| WO | 2019055703 | 3/2019 | | |
| WO | WO-2023212635 A1 | 11/2023 | | |

OTHER PUBLICATIONS

"International Application Serial No. PCT/US2023/066286, Written Opinion mailed Jul. 24, 2023", 5 pgs.

* cited by examiner

CONTEXT-BASED SELECTION OF AUGMENTED REALITY EXPERIENCES

TECHNICAL FIELD

The present disclosure relates generally to facilitating interactions between devices hosting a messaging application.

BACKGROUND

As the popularity of computer-implemented tools that permit users to access and interact with content and other users online continues to grow, various computer-implemented tools are being developed to permit users to interact and share content with other users through messaging applications. For example, a messaging system may host a backend service for an associated messaging client that is configured to permit users to interact asynchronously via messages and, also, synchronously via audio and video interactions. A messaging system may also permit users to engage in shared experiences, such as multi-player games. Users in the messaging system are represented by respective profiles storing information pertaining to the associated users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
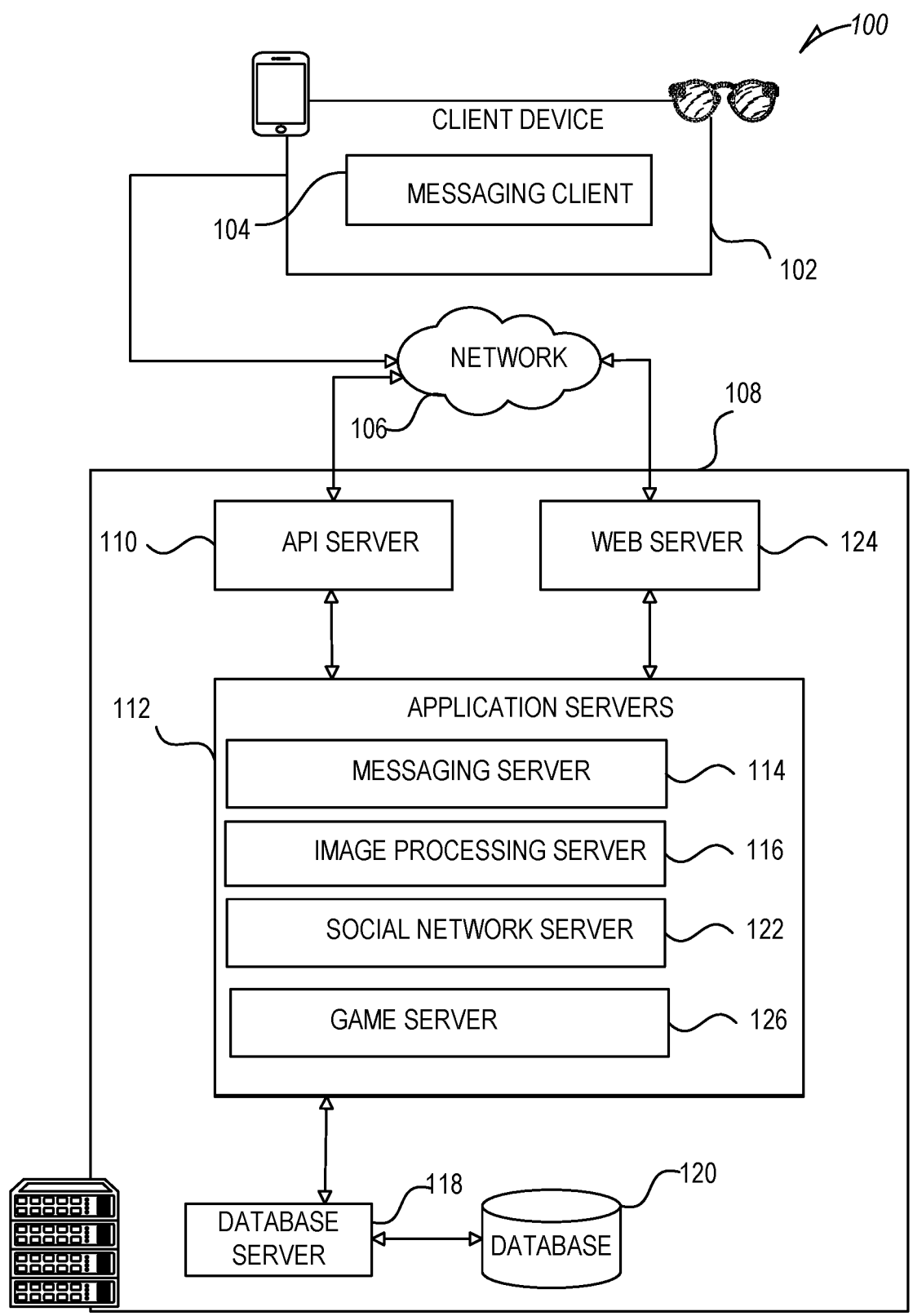
FIG. 1 is a diagrammatic representation of a networked environment in which context-based selection of augmented reality experiences may be deployed, in accordance with some examples.

Embodiments of the present disclosure improve the functionality of electronic messaging software and systems by enhancing the experience of users who wish to interact with their environment and/or with each other using augmented reality (AR) technology through their respective user devices.

AR is an environment, in which the real world, as viewed through a digital camera, for example, is augmented by overlaying virtual content over the view of the real world presented on the display of a user device. A computing application that uses AR technology and that can be accessed through a messaging client is referred to as an AR experience. An AR experience may be configured to leverage certain aspects of the physical environment of the user device executing the messaging client. For example, an AR experience may require at least two human participants or at least two user devices executing the messaging client located in close physical proximity to each other. In another example, an AR experience that is configured to imitate ghosts, requires a smart light. In yet another example, a dog or a cat may be a necessary aspect of the physical environment of the user device executing the messaging client in order to engage in a particular AR experience. A user may not be aware of every AR experience available to them through the messaging client, and it may be frustrating for a user to discover an interesting AR experience that can be accessed through the messaging client only to learn that it cannot be used due to the physical environment lacking one or more aspects required by that AR experience. On the other hand, a user may not be aware of an AR experience that is well suited for the user's current physical environment.

An example of an AR experience that requires one user device and multiple participants is one that tracks the participants' heads in the output of the digital image sensor of a camera and displays instructions directing that the user device is to be passed from one participant to another. An example of an AR experience that requires multiple user participants and multiple user devices is one that provides a virtual object that the participants can each move around on their respective screens trying to "hit" with it the other participant as they are seen in the output of the digital image sensor of a camera. An example of an AR experience that incorporates the movement of an animal is one that tracks the representation of the animal, such as a dog or a cat, in a display of an output of a digital image sensor of a camera of the user device and generates UI elements and/or instructions for the user based on the animal's movement or sound as detected by the digital image sensor and/or microphone.

The users' experience of engaging with AR technology that permits users to interact with their environment and with each other is enhanced by automatically selecting an AR experience that is usable given the physical environment of the user. The physical environment of the user, which is the physical environment of the user device controlled by the user, may include objects and/or conditions present in close proximity to the user device, such as other humans, animals, smart devices, as well as conditions such as a cloudy sky, and so on. The physical environment of the user device executing the messaging client is referred to as a physical context, for the purposes of this description. In some examples, the automatic selection of an AR experience that is usable given the physical environment of the user is performed by an AR experience selection system provided by the messaging system.

Figure 7:
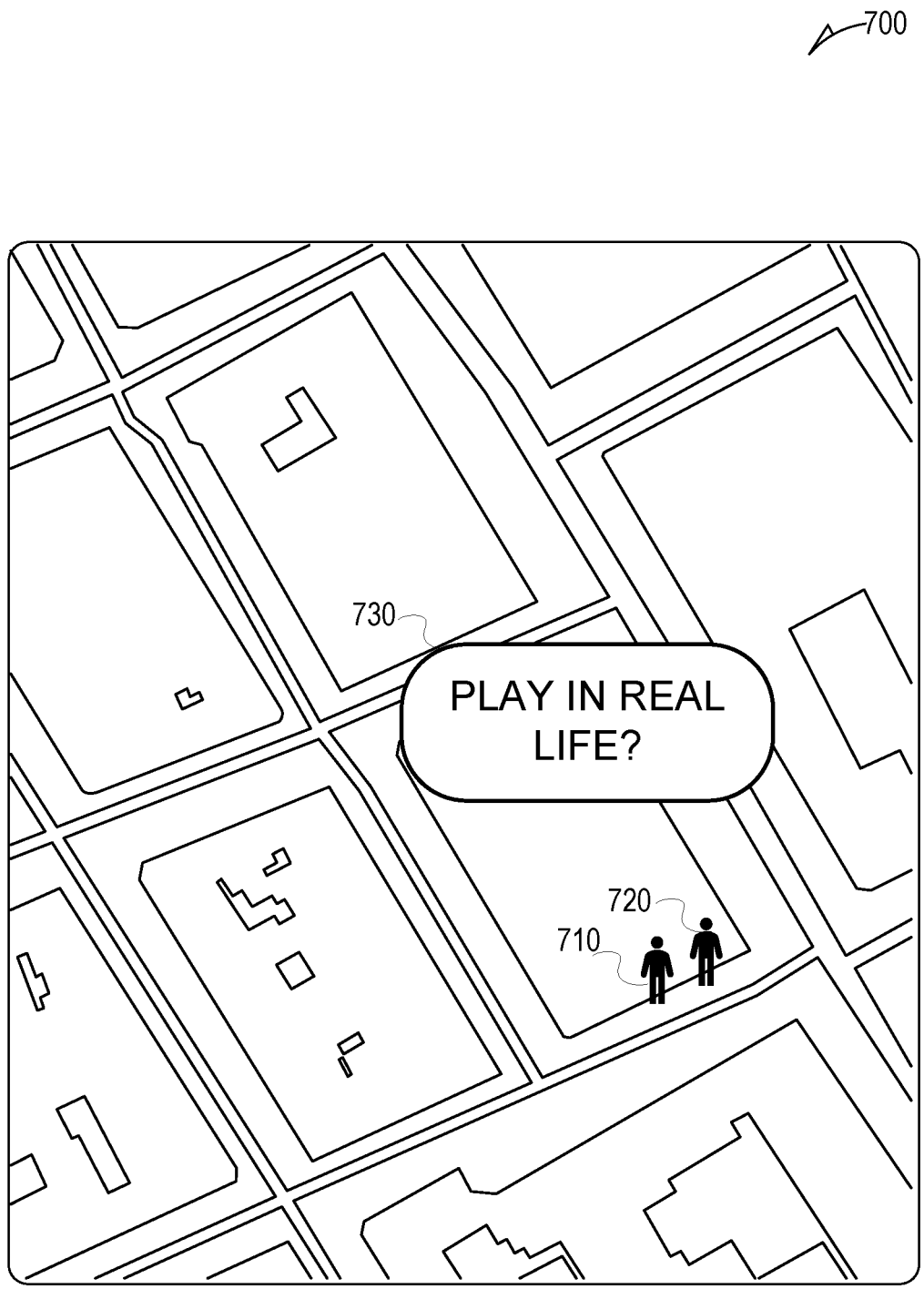
FIG. 7 is a diagram illustrating a map user interface (UI) displayed by a messaging client executing on a user device, in accordance with some examples.

The automatic selection of an AR experience that is usable given the physical environment of the user may be triggered by a predetermined event detected by the AR experience selection system. A predetermined event that triggers selection of an AR experience that is usable given the physical environment is referred to as a trigger event or an entry point, for the purposes of this description. An example trigger event detected by the AR experience selection system is co-location of the user device and another user device executing the messaging client. Co-location of two devices may be detected using a map system, which is described below, with reference to FIG. 2. An example of a map UI that includes an indication of co-location and an invitation to engage in an AR experience that leverages the physical presence of another participant is shown in FIG. 7. Another entry point for engaging the AR experience selection system is associated with camera scanning, where a trigger event is detecting a certain type of a physical object, such as a human or a cat, in the output of a digital sensor of a camera of the user device. In some examples, a trigger event may be detected when a user is taking a selfie using a camera UI of the messaging client. The camera UI is configured to display the output of a digital image sensor of a camera provided with an associated user device and to display a user selectable element actionable to capture an image by the camera or to start and stop video recording.

Figure 8:
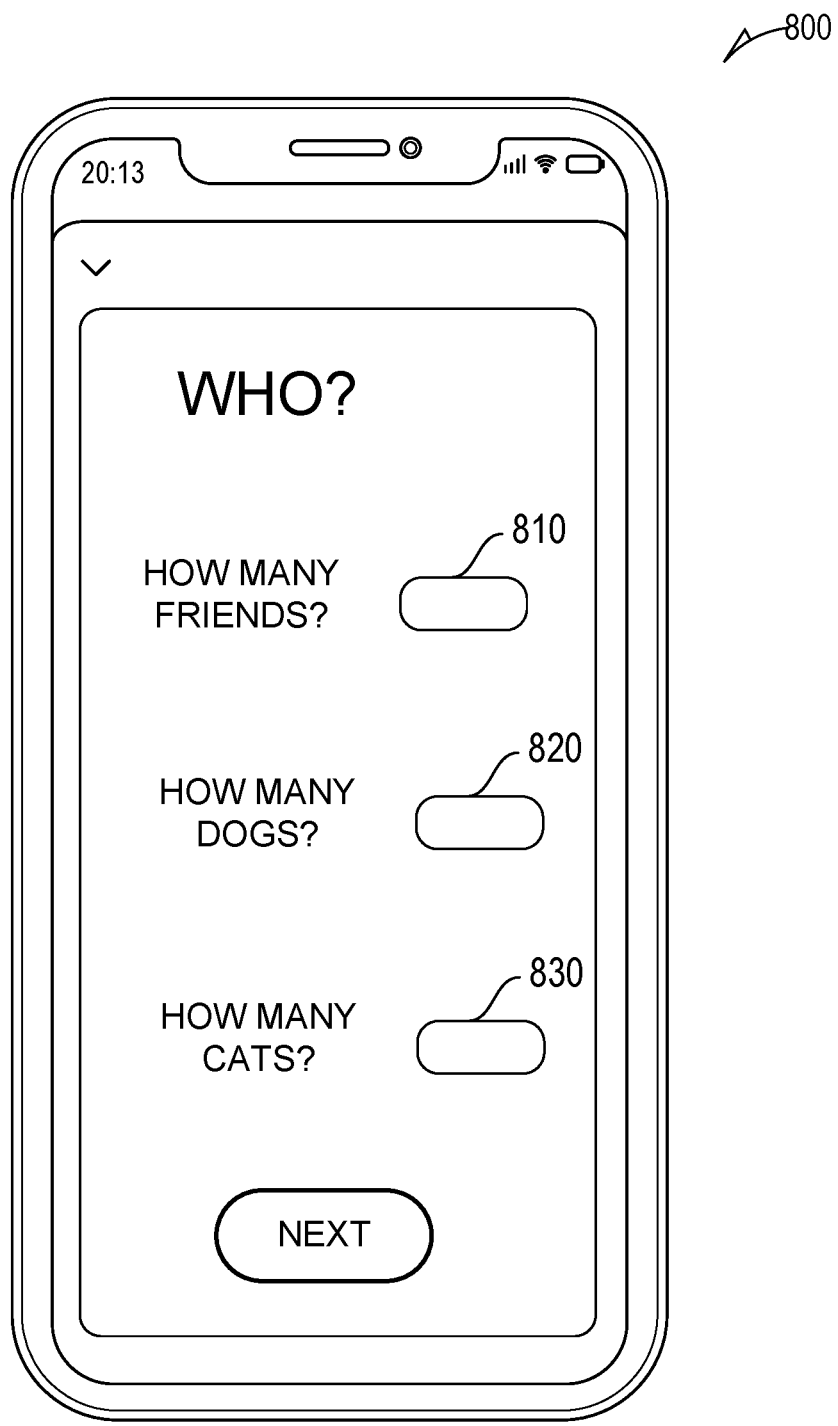
FIG. 8 is a diagram illustrating a participants UI for obtaining information about the physical environment of the user device, in accordance with some examples.
Figure 9:
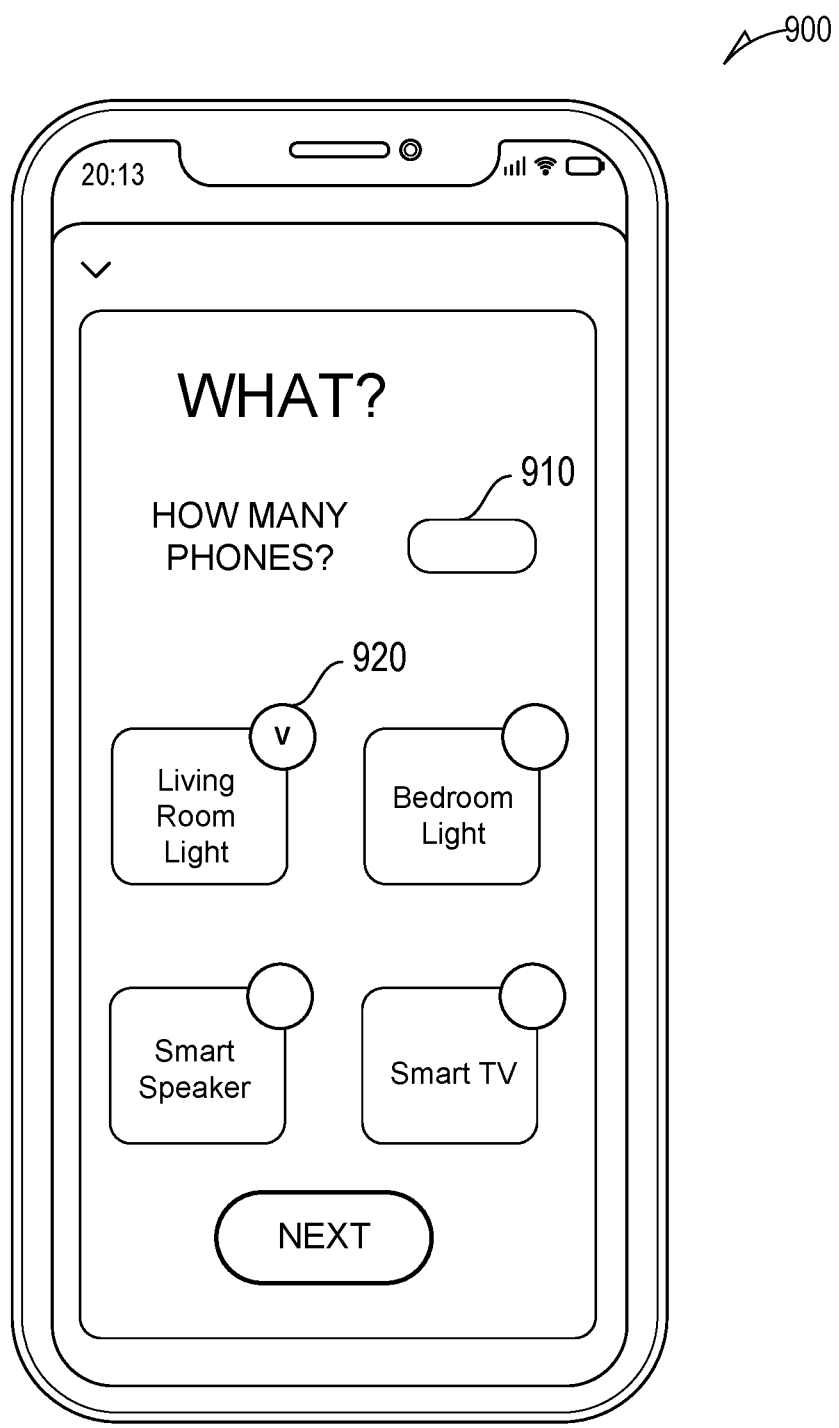
FIG. 9 is a diagram illustrating an IoT devices UI for obtaining information about the physical environment of the user device, in accordance with some examples.
Figure 10:
FIG. 10 is a diagram illustrating a selection UI that includes a reference to the identified suitable AR experience, in accordance with some examples.

In some examples, the AR experience selection system is configured to generate a UI for obtaining information about the physical environment of the user device (physical context), such as shown in FIG. 8 and FIG. 9, to identify a suitable AR experience based on the physical context, and to generate a UI that includes a reference to the identified suitable AR experience, as is shown in FIG. 10. The reference to the identified suitable AR experience is actionable to launch the AR experience at the user device.

The AR experience selection system may be configured to permit saving and sharing of content generated in the process of engaging in AR experiences that leverage aspects of the physical environment of the user device executing the messaging client. Such content may be tagged with an In Real Life (IRL) label and saved as IRL content in the user's profile. In some examples, such as where the entry point for selection of an AR experience is physical co-location identified by the map system, the IRL content is saved in a shared profile representing IRL experiences common to two or more users of the messaging system. The messaging system may be configured to permit users to store and view the saved IRL content and to share it with other users of the messaging system. An AR experience that uses IRL features may be described as a digital space, in which various aspects of interaction of the user with the physical environment are tracked and recorded. Examples of IRL features IRL features include tracking representation of a person and/or an animal displayed in the camera view UI or interacting with smart devices such as a fitness tracker or a smart light.

Details of the messaging system configured to include a location-based shared AR experience system are described below.

Networked Computing Environment

FIG. 1 is a block diagram 100 showing an example messaging system for exchanging data (e.g., messages and associated content) over a network. The messaging system includes multiple instances of a messaging client 104 executing at respective client devices such as a client device 102 and a messaging server system 108. Each messaging client 104 is communicatively coupled to other instances of the messaging client 104 and a messaging server system 108 via a network 106 (e.g., the Internet). The client device 102 is a smartphone, AR glasses or another type of device that is able to display AR content, has access to a global position provider (e.g., GPS), and has a network connection.

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include, as examples, message content, client device information, geolocation information, media augmentation and overlays, message content persistence conditions, social network information, live event information, as well as images and video captured with a front facing camera of an associated client device using customized image reprocessing. Data exchanges within the messaging system are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114. Some of the various image processing operations may be performed by various AR components, collectively referred to as an AR engine, which can be hosted or supported by the image processing server 116. An AR engine, in some examples, is used to facilitate the functionality provided by the AR experience selection system, which is described herein.

Figure 3:
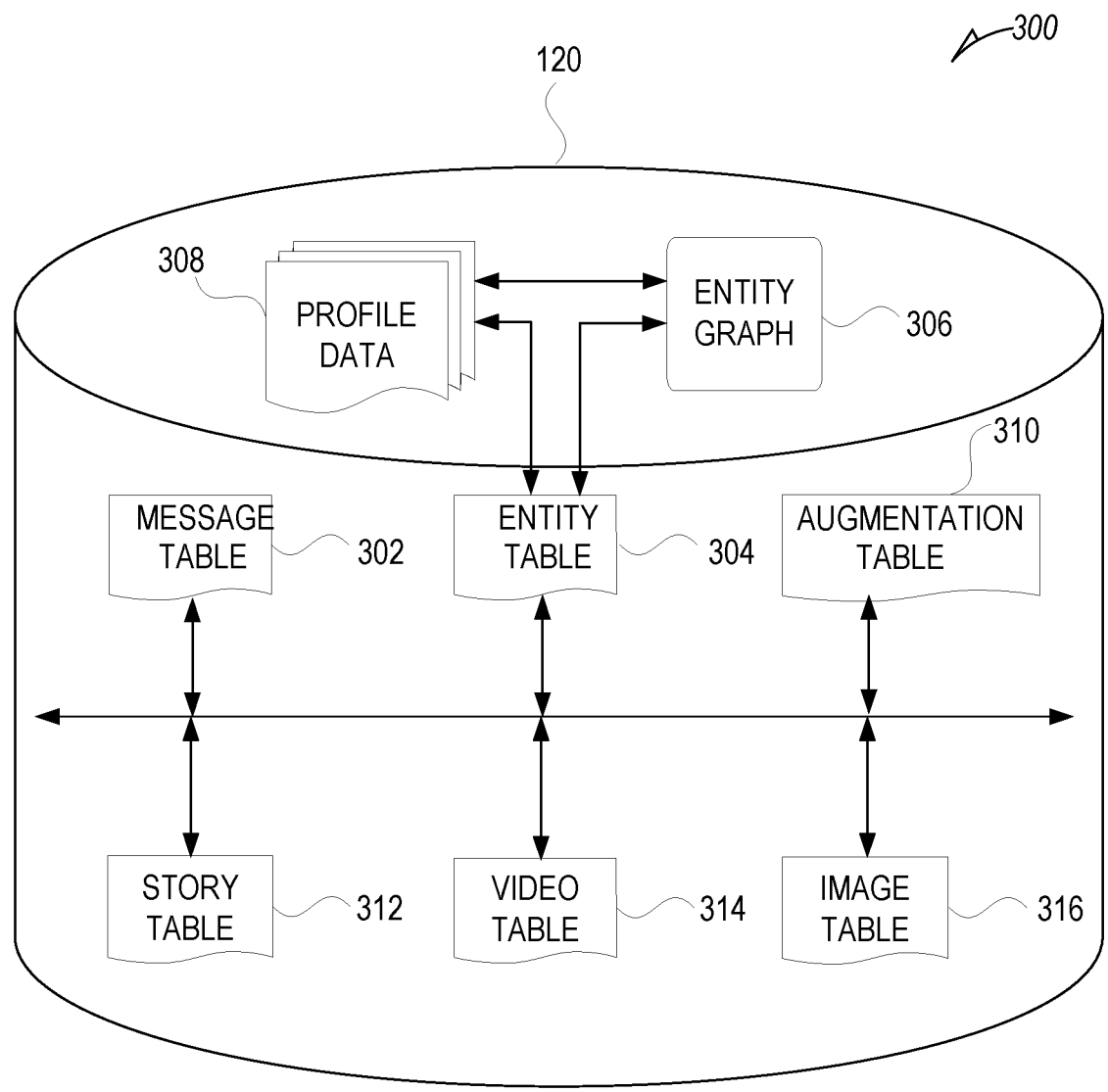
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system with which a particular user has a "friend" relationship or is "following," and also the identification of other entities and interests of a particular user.

The game server 126, in some examples, is configured as the authoritative source of user actions and the effects of user actions, also referred as events, in a multiplayer game. The game server 126 being the authoritative source of events in a multiplayer game means that each user device engaged in the same multiplayer game maintains a version of the state of the game, which is consistent with the respective versions of the state of the game available to other users via their respective user devices. In some examples, a multi-player game is a shared AR experience.

System Architecture

Figure 2:
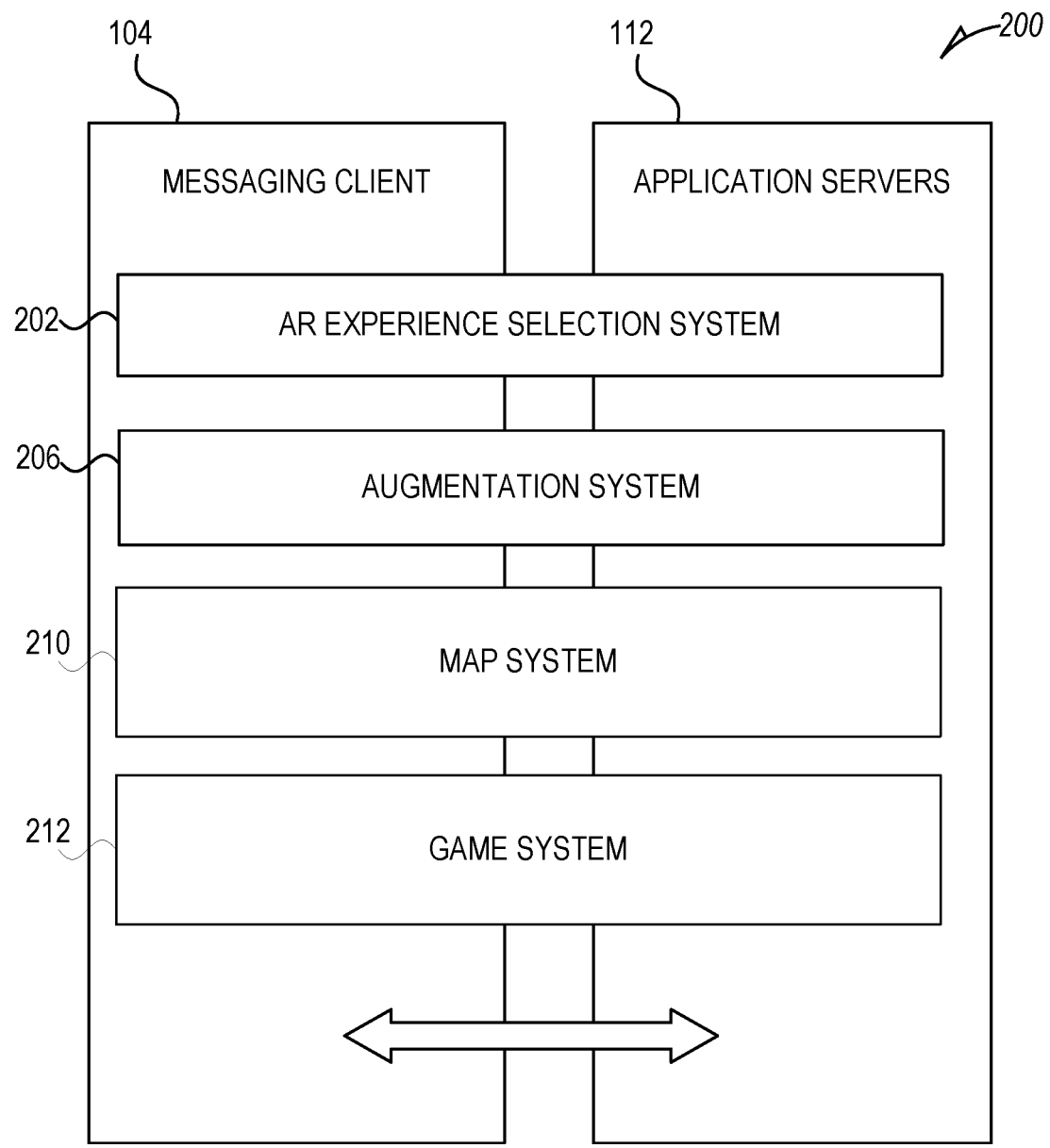
FIG. 2 is a diagrammatic representation of a messaging system, in accordance with some examples, that has both client-side and server-side functionality.

FIG. 2 is a block diagram 200 illustrating further details regarding the messaging system, according to some examples. Specifically, the messaging system is shown to comprise the messaging client 104 and the application servers 112. The messaging system embodies a number of subsystems, which are supported on the client-side by the messaging client 104, and on the sever-side by the application servers 112. These subsystems include, for example a AR experience selection system 202, an augmentation system 206, a map system 210, and a game system 212.

The AR experience selection system 202 is configured to automatically select one or more AR experiences that are usable given the immediate physical environment of a user device The AR experience selection system 202, in response to detecting a trigger event at a user device, determines the physical context for the messaging client executing at the user device. Example trigger events include detecting co-location of the user device and another user device executing the messaging client and detecting a certain type of a physical object, such as a human or a cat, in the output of a digital sensor of a camera of the user device. The physical context includes characteristics of the physical environment of the user device controlled by the user and may include objects and/or conditions present in close proximity to the user device, such as other humans, animals and smart devices.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system. The media overlays may be stored in the database 120 and accessed through the database server 118.

In some examples, the augmentation system 206 is configured to provide access to AR components that can be implemented using a programming language suitable for application development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement. In some embodiments, the augmentation system 206 is used by the AR experience selection system 202 as an AR engine to perform tasks such as generating and tracking one or more virtual objects that may be provided by a shared AR experience.

The map system 210 provides various geographic location functions, and supports the presentation of map-based media content and messages by the messaging client 104. For example, the map system 210 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users. In some embodiments, the map system 210 is used by the AR experience selection system 202 to determine co-location of the user device and another user device executing the messaging client and to generate a map user interface that includes an indication of co-location and an invitation to engage in an AR experience that leverages the physical presence of another participant. An example of a map UI that includes an indication of co-location and an invitation to engage in an AR experience that leverages the physical presence of another participant is shown in FIG. 7 and discussed below.

The game system 212 provides various gaming functions within the context of the messaging client 104. The messaging client 104 provides a game interface providing a list of available games that can be launched by a user within the context of the messaging client 104, and played with other users of the messaging system 100, including one or more AR experiences.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. As explained above, users in the messaging system are represented by respective profiles storing information pertaining to the associated users. The profile data 308 may be selectively used and presented to other users of the messaging system, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). The profile data 308 may include saved IRL content, which can be accessed by a user of the messaging system by viewing a profile of another user of the messaging system, which is a way to view details about the user's friendship with another user in the messaging system. The saved IRL content is associated with IRL AR experiences that two users experienced together.

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is a target media content object, which may be associated with an AR component and used to generate an AR experience for a user, as described above.

Another example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications. AR tools may also be used to apply modifications to stored content, such as video clips or still images stored in a gallery. In a client device 102 with access to multiple AR tools, a user can apply different AR tools (e.g., by engaging different AR components configured to utilize different AR tools) to a single video clip to see how the different AR tools would modify the same video clip. For example, multiple AR tools that apply different pseudorandom movement models can be applied to the same captured content by selecting different AR tools for the same captured content. Similarly, real-time video capture may be used with an illustrated modification to show how video images currently being captured by a digital image sensor of a camera provided with a client device 102 would modify the captured data. Such data may simply be displayed on the screen and not stored in memory, or the content captured by digital image sensor may be recorded and stored in memory with or without the modifications (or both). A messaging client 104 can be configured to include a preview feature that can show how modifications produced by different AR tools will look, within different windows in a display at the same time. This can, for example, permit a user to view multiple windows with different pseudorandom animations presented on a display at the same time.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story. In some examples, the story table 312 can store content generated by the AR experience selection system, such as IRL content.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in some examples, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
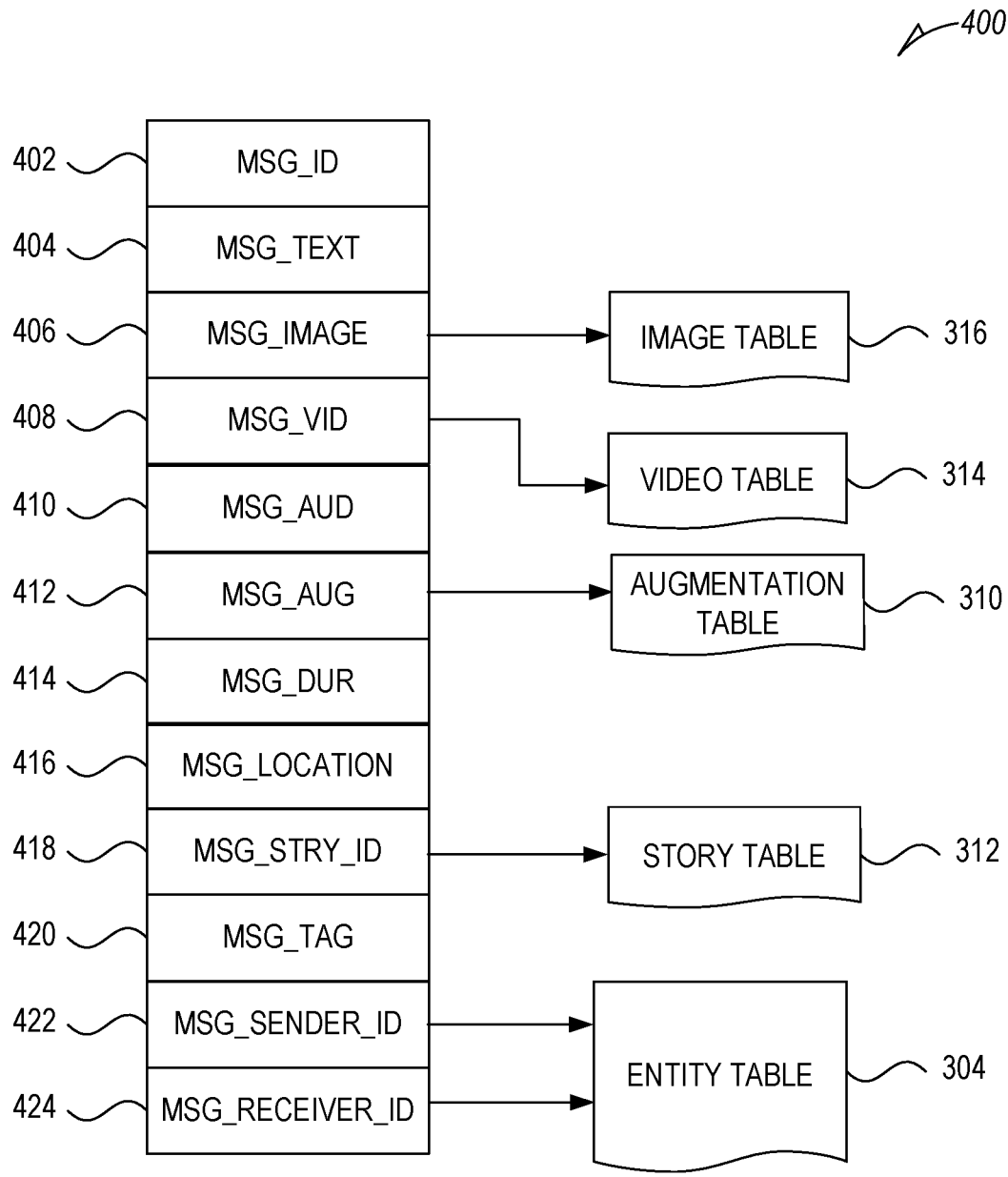
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. The content of a message 400, in some examples, includes an image or a video that was created using the AR component. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316. The image data may include content generated by the AR experience selection system.
- message video payload 408: video data, captured by a camera component or retrieved from a memory component of the client device 102, and that is included in the message 400. Video data for a sent or received message 400 may be stored in the video table 314. The video data may include content generated by the AR experience selection system.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
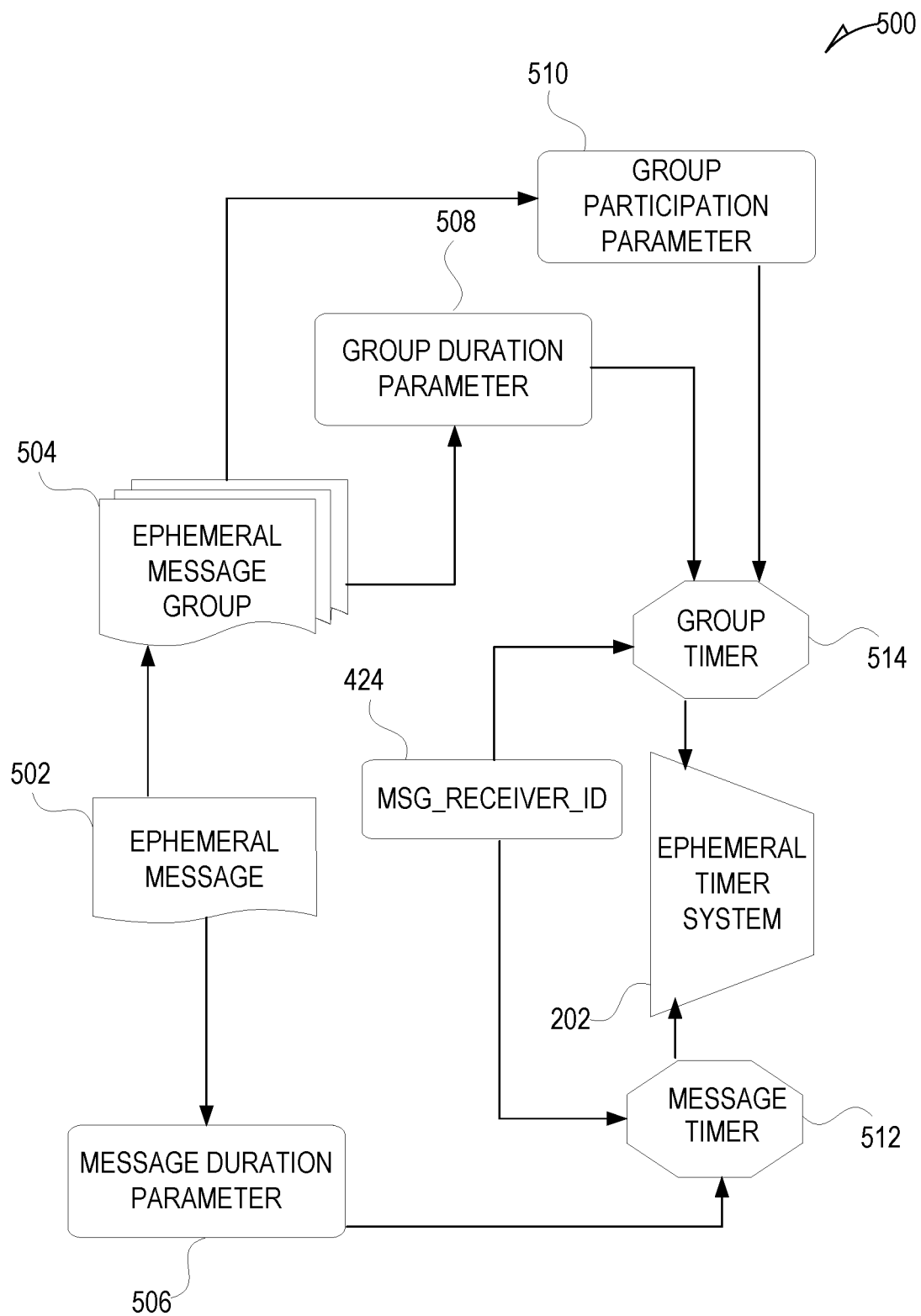
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral). The content of an ephemeral message 502, in some examples, includes an image or a video that was created by the AR experience selection system.

An ephemeral message 502 is shown to be associated with a message duration parameter 506, the value of which determines an amount of time that the ephemeral message 502 will be displayed to a receiving user of the ephemeral message 502 by the messaging client 104. In some examples, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In some examples, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Process Flow

Figure 6:
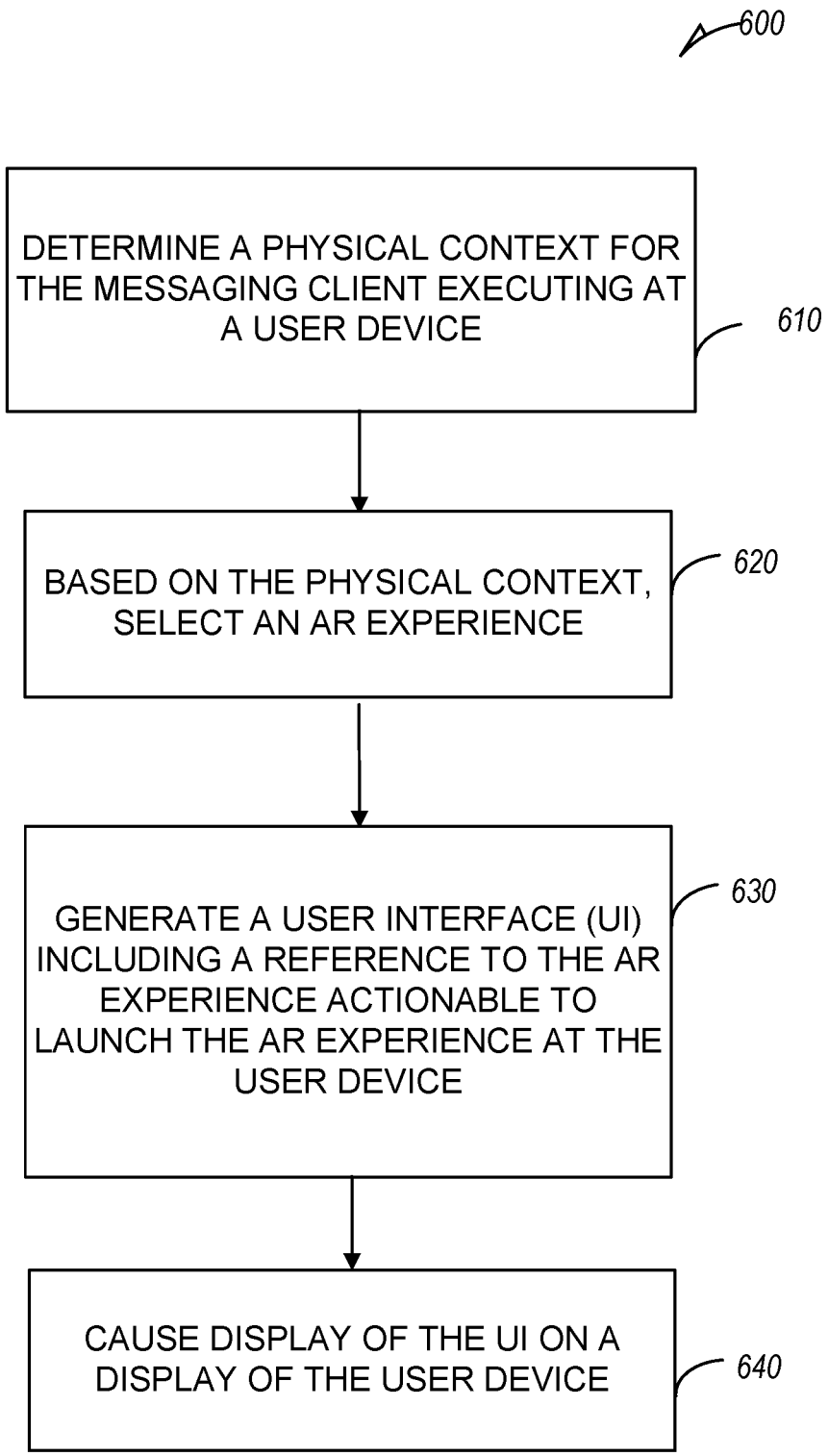
FIG. 6 is a flowchart of a method for providing context-based selection of augmented reality experiences, in accordance with some examples.

FIG. 6 is a flowchart of a method 600 for context-based selection of AR experiences, in accordance with some examples.

Although the described flowchart can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems. In one example embodiment, some or all processing logic resides at the client device 102 of FIG. 1 and/or at the messaging server system 108 of FIG. 1. The client device 102 may be a smartphone or AR glasses, for example.

The method 600 commences at operation 610, when the AR experience selection system 202 of FIG. 2 determines a physical context for the messaging client executing at a user device. The physical context includes characteristics of the physical environment of the user device that is controlled by the user. For example, the physical context may include objects and/or conditions present in close proximity to the user device, such as other humans, animals, Internet of things (IoT) devices, as well as conditions such as a cloudy sky, and so on. An IoT device is a device that is capable of exchanging data with other devices over a network and that may include sensors and data processing capability. Examples of IoT devices, also referred to as smart devices, include fitness trackers, voice-activated speakers, smart lights and so on.

At operation 620, the AR experience selection system 202 selects, from a plurality of AR experiences provided by the messaging system, an AR experience suitable for the physical environment represented by the physical context. For example, the physical context may include a second user device that is executing the messaging client and that is within a predetermined distance from the user device. An AR experience suitable for the physical environment represented by this physical context may be a shared AR experience, which is permitting users to manipulate a virtual object from the user device and from the further user device.

In another example, the physical context may be an indication of a person and/or an animal in the camera view UI of the messaging client. An AR experience suitable for the physical environment represented by this physical context may be an AR experience configured to track the indication of the animal or the person in the camera view UI. In an example where the physical context is a smart light, a suitable AR experience is one that is configured to communicate with the smart light.

At operation 630, the AR experience selection system 202 generates an experience selection UI including a reference to the AR experience. The reference is actionable to launch the AR experience at the user device, and cause display of the selection UI on a display of the user device at operation 640.

The method 600 can be triggered in response to determining that two devices are co-located, which can be determined using the map system 210 of FIG. 2 or using Bluetooth® technology. The method 600 can also be triggered in response to the AR experience selection system 202 receiving a request to engage in an AR experience suitable for the physical environment of the user device. The method 600 can also be triggered by the AR experience selection system 202 detecting engagement of camera scanning functionality with respect to the output of the digital image sensor of the camera of the user device.

User Interface

FIG. 7 is a diagram 700 that illustrates a map UI displayed by the messaging client executing on a first user device controlled by a user represented in the map UI by reference numeral 710, in accordance with some examples. The map UI shows, in addition to the user 710, another user represented by reference numeral 720. The user 720 controls a second user device that is executing the messaging client and that is located within a predetermined physical proximity (e.g., six feet or less) to the first user device. In response to determining that the first user device and the second user device are located within a predetermined physical proximity to each other, the AR experience selection system 202 of FIG. 2 causes presentation of an invitation 730, inviting the users to engage in an IRL AR experience. Respective instances of the map UI are displayed on both the first user device and the second user device.

FIG. 8 is a diagram 800 illustrating a participants UI for obtaining information about people and animals that may be present in the immediate physical environment of the user device, in accordance with some examples. Area 810 in FIG. 8 is configured to accept input from the user of a number of people that are in close physical proximity to the user. Area 820 is configured to accept input from the user of a number of dogs that are in close physical proximity to the user. Area 830 is configured to accept input from the user of a number of cats that are in close physical proximity to the user.

FIG. 9 is a diagram 900 illustrating an IoT devices UI for obtaining information about IoT devices that are present in the immediate the physical environment of the user device, in accordance with some examples. For example, as shown in FIG. 9, area 910 is configured to accept user input of a number of computing devices (e.g., smart phones) executing the messaging client that are in close physical proximity to the user, and area 920 is configured to accept user input of a number of smart lights that are active and in close physical proximity to the user device. An example of an AR experience that uses an IoT device such as a smart light is one that generates UI elements and/or instructions for the player based on the behavior of the smart light, e.g., based on the changes in color and/or brightness of the smart light.

FIG. 10 is a diagram 1000 illustrating a selection UI that includes a reference to the identified suitable AR experience, which is identified by reference numeral 1010. The AR experience selection system 202 identified the suitable AR experience based on the physical context indicating two users being in close physical proximity to each other and availability of an IoT device, a smart light.

Figure 11:
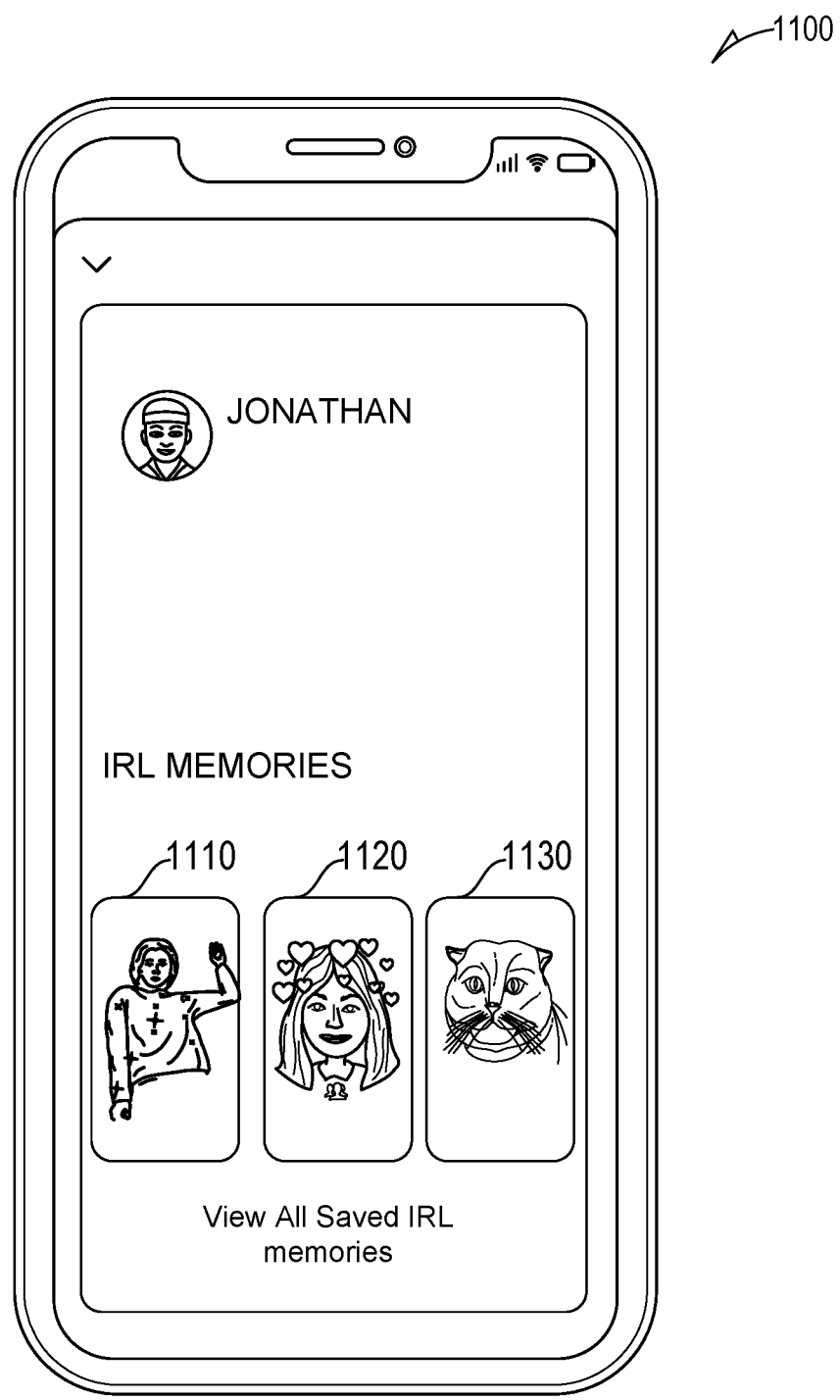
FIG. 11 is a diagram illustrating a user profile UI displaying references to content generated in the process of the user engaging in In Real Life (IRL) AR experiences, in accordance with some examples.

FIG. 11 is a diagram 1100 illustrating a user profile UI displaying references to content generated in the process of the user engaging with IRL AR experiences, in accordance with some examples. In FIG. 11, the user profile UI displays the associated user's avatar and name (JONATHAN) and also includes respective references 1110, 1120 and 1130 that are each actionable to access content generated in the process of the user engaging in respective associated IRL AR experiences. The diagram 1100 illustrates references to content generated in the process of engaging with IRL AR experiences of a viewer with a specific user (JONATHAN). In some example, the user identified as JONATHAN is also permitted to view content generated in the process of him engaging with the IRL AR experiences.

Machine Architecture

Figure 12:
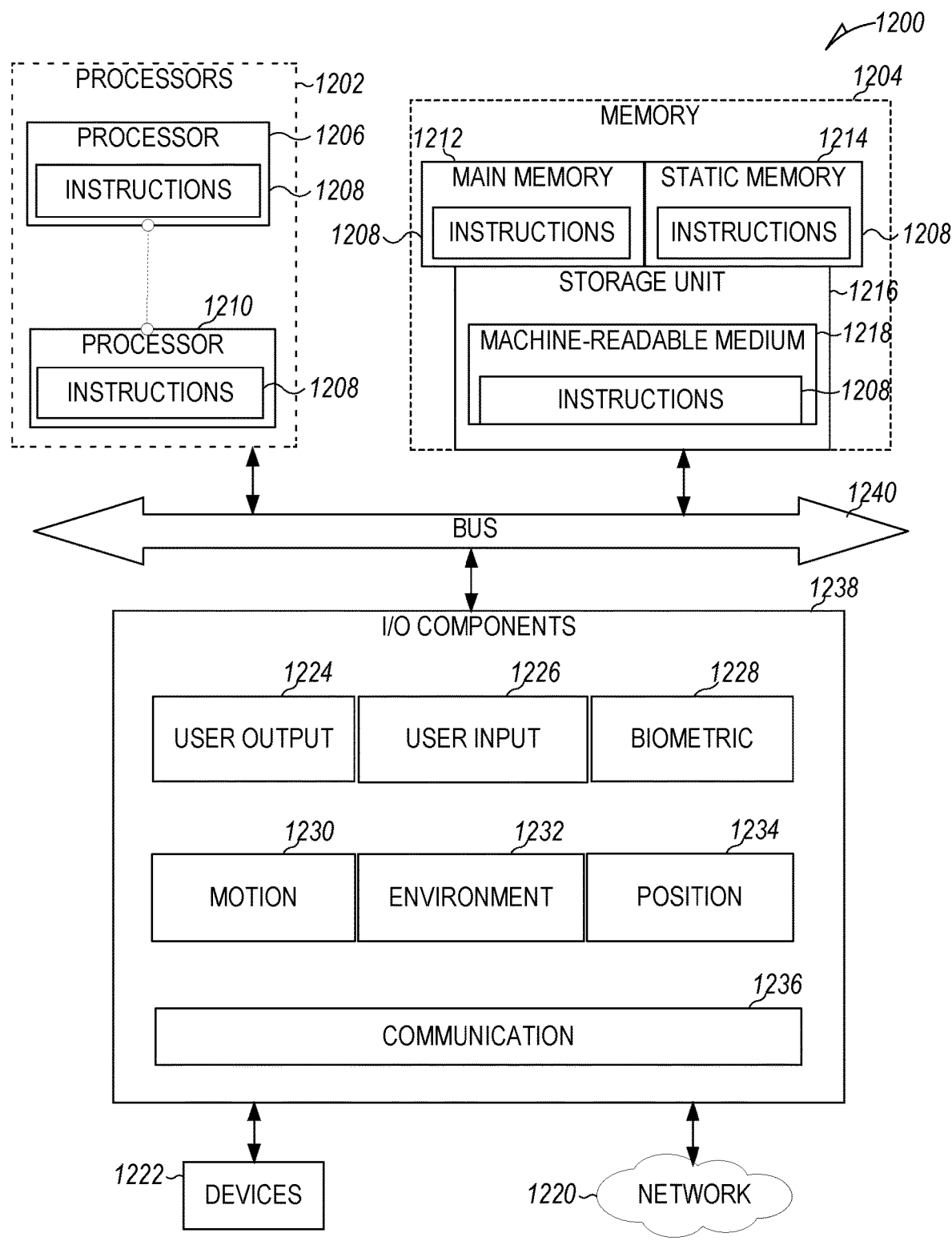
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein. The machine 1200, for example, may comprise the client device 102 or any one of a number of server devices forming part of the messaging server system 108. In some examples, the machine 1200 may also comprise both client and server systems, with certain operations of a particular method or algorithm being performed on the server-side and with certain operations of the particular method or algorithm being performed on the client-side.

The machine 1200 may include processors 1202, memory 1204, and input/output I/O components 1238, which may be configured to communicate with each other via a bus 1240. In an example, the processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single-core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1240. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the Processor's cache memory), or any suitable combination thereof, during execution thereof by the machine 1200.

The I/O components 1238 may include a wide variety of components to receive input, provide output, produce output, transmit information, exchange information, capture measurements, and so on. The specific I/O components 1238 that are included in a particular machine will depend on the type of machine. For example, portable machines such as mobile phones may include a touch input device or other such input mechanisms, while a headless server machine will likely not include such a touch input device. It will be appreciated that the I/O components 1238 may include many other components that are not shown in FIG. 12. In various examples, the I/O components 1238 may include user output components 1224 and user input components 1226. The user output components 1224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1238 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 include acceleration sensor components (e.g., accelerometer), gravitation sensor components, rotation sensor components (e.g., gyroscope).

The environmental components 1232 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1238 further include communication components 1236 operable to couple the machine 1200 to a network 1220 or devices 1222 via respective coupling or connections. For example, the communication components 1236 may include a network interface Component or another suitable device to interface with the network 1220. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1212, static memory 1214, and memory of the processors 1202) and storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed examples.

The instructions 1208 may be transmitted or received over the network 1220, using a transmission medium, via a network interface device (e.g., a network interface component included in the communication components 1236) and using any one of several well-known transfer protocols (e.g., hypertext transfer protocol (HTTP)). Similarly, the instructions 1208 may be transmitted or received using a transmission medium via a coupling (e.g., a peer-to-peer coupling) to the devices 1222.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
in a messaging system that hosts a backend service for a messaging client and that provides a plurality of augmented reality (AR) experiences, the messaging client providing a camera view user interface (UI) including an output of a digital image sensor of a camera, determining a physical context for the messaging client executing at a user device;
causing display of a participants UI on a display of the user device;
receiving input via the participants UI of a number of participating user devices in a physical proximity of the user device;
selecting an AR experience from the plurality of AR experiences based on the determined physical context and the input, the AR experience satisfying the number of participating user devices;
generating an experience selection UI including a reference to the AR experience, the reference actionable to launch the AR experience at the user device;
causing display of the experience selection UI including the reference actionable to launch the AR experience on the display of the user device;
storing content in shared profile data associated with users who participated in the AR experience, the content generated from engagement with the AR experience by the participating user device, the shared profile data including AR experiences common to the users who participated in the AR experience; and
providing access to the content generated from engagement with the AR experience by the user device, the access provided through a profile associated with a user of the user device, the AR experience selectively accessible by the users who participated in the AR experience through the profile.

2. The method of claim 1, wherein the determining of the physical context comprises determining that the user device is within a predetermined distance from a further user device, the participating user devices including the further user device.

3. The method of claim 2, further comprising:
responsive to determining the user device is within the predetermined distance from the further user device, causing display of an invitation to engage in a shared AR experience with the further user device.

4. The method of claim 2, wherein the AR experience is a shared AR experience permitting users to manipulate a virtual object from the participating user devices.

5. The method of claim 1, wherein the causing display of the participants UI is in response to a detection of a trigger event, the trigger event comprising at least one of the user taking a selfie using the camera view UI of the user device or a co-location of the user device and the participating user devices.

6. The method of claim 1, wherein the determining of the physical context comprises using the output of the digital sensor of the camera, the determined physical context comprises an animal in the camera view UI, wherein the AR experience is configured to track the animal in the camera view UI.

7. The method of claim 1, wherein the determined physical context comprises an environmental condition.

8. The method of claim 1, wherein the determining of the physical context comprises using the output of the digital sensor of the camera, the determined physical context comprises a person, wherein the AR experience is configured to track the person in the camera view UI.

9. The method of claim 1, wherein the determined physical context comprises a smart light, wherein the AR experience is configured to communicate with the smart light to change a color or a brightness of the smart light.

10. The method of claim 1, wherein the user device is a smartphone or AR glasses.

11. A system comprising:
one or more processors; and
a non-transitory computer readable storage medium comprising instructions that when executed by the one or more processors cause the one or more processors to perform operations comprising:
in a messaging system that hosts a backend service for a messaging client and that provides a plurality of augmented reality (AR) experiences, the messaging client providing a camera view user interface (UI) including an output of a digital image sensor of a camera, determining a physical context for the messaging client executing at a user device;
causing display of a participants UI on a display of the user device;
receiving input via the participants UI of a number of participating user devices in a physical proximity of the user device;
selecting an AR experience from the plurality of AR experiences based on the determined physical context and the input, the AR experience satisfying the number of participating user devices;
generating an experience selection UI including a reference to the AR experience, the reference actionable to launch the AR experience at the user device;
causing display of the experience selection UI including the reference actionable to launch the AR experience on the display of the user device;
storing content in shared profile data associated with users who participated in the AR experience, the content generated from engagement with the AR experience by the participating user device, the shared profile data including AR experiences common to the users who participated in the AR experience; and
providing access to the content generated from engagement with the AR experience by the user device, the access provided through a profile associated with a user of the user device, the AR experience selectively accessible by the users who participated in the AR experience through the profile.

12. The system of claim 11, wherein the determining of the physical context comprises determining that the user device is within a predetermined distance from a further user device, the participating user devices including the further user device.

13. The system of claim 12, the instructions further causing the one or more processors to perform operations comprising:
responsive to determining the user device is within the predetermined distance from the further user device, causing display of an invitation to engage in a shared AR experience with the further user device.

14. The system of claim 12, wherein the AR experience is a shared AR experience permitting users to manipulate a virtual object from the participating user devices.

15. The system of claim 11, wherein the determining of the physical context comprises using the output of the digital sensor of the camera.

16. The system of claim 15, wherein the determined physical context comprises an animal in the camera view UI, wherein the AR experience is configured to track the animal in the camera view UI.

17. The system of claim 15, wherein the determined physical context comprises a person, wherein the AR experience is configured to track the person in the camera view UI.

18. The system of claim 11, wherein the determined physical context comprises an environmental condition.

19. The system of claim 11, wherein the determined physical context comprises a smart light, wherein the AR experience is configured to communicate with the smart light to change a color or a brightness of the smart light.

20. A machine-readable non-transitory storage medium having instruction data executable by a machine to cause the machine to perform operations comprising:
in a messaging system that hosts a backend service for a messaging client and that provides a plurality of augmented reality (AR) experiences, the messaging client providing a camera view user interface (UI) including an output of a digital image sensor of a camera, determining a physical context for the messaging client executing at a user device;
causing display of a participants UI on a display of the user device;
receiving input via the participants UI of a number of participating user devices in a physical proximity of the user device;
selecting an AR experience from the plurality of AR experiences based on the determined physical context and the input, the AR experience satisfying the number of participating user devices;
generating an experience selection UI including a reference to the AR experience, the reference actionable to launch the AR experience at the user device;
causing display of the experience selection UI including the reference actionable to launch the AR experience on the display of the user device;
storing content in shared profile data associated with users who participated in the AR experience, the content generated from engagement with the AR experience by the participating user device, the shared profile data including AR experiences common to the users who participated in the AR experience; and
providing access to the content generated from engagement with the AR experience by the user device, the access provided through a profile associated with a user of the user device, the AR experience selectively accessible by the users who participated in the AR experience through the profile.

* * * * *